July 1, 1969 G. W. CARR 3,453,019
TRAILER POST CONSTRUCTION
Filed July 31, 1967
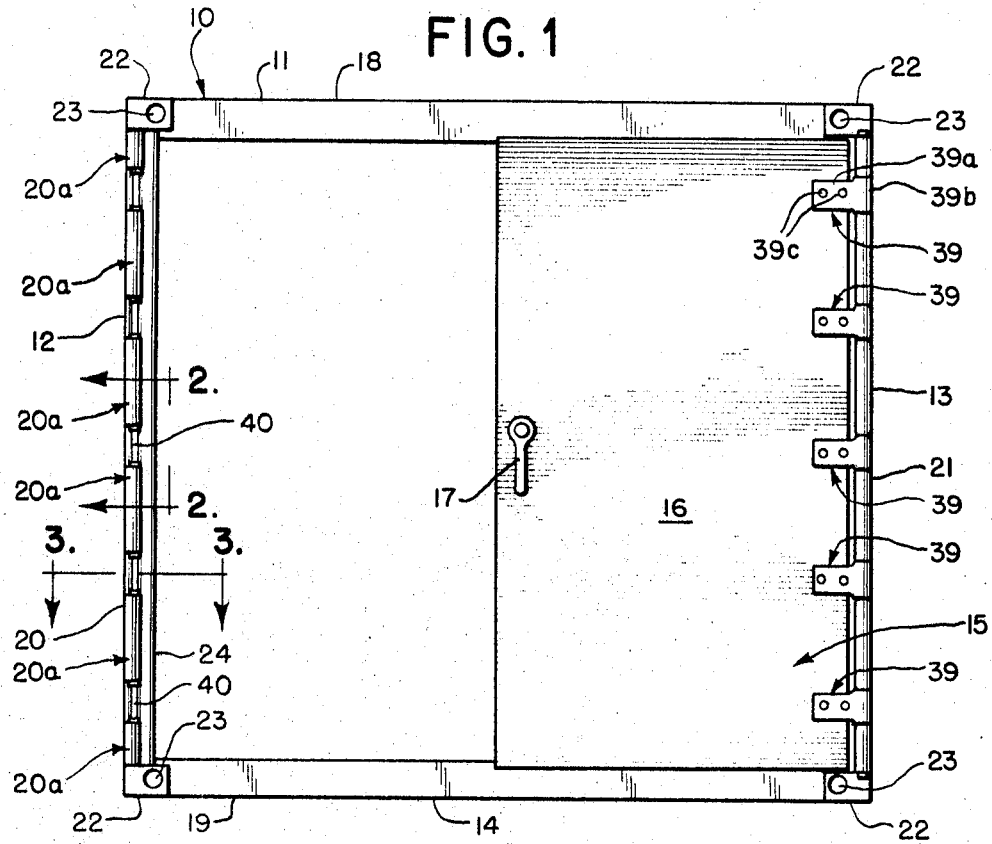
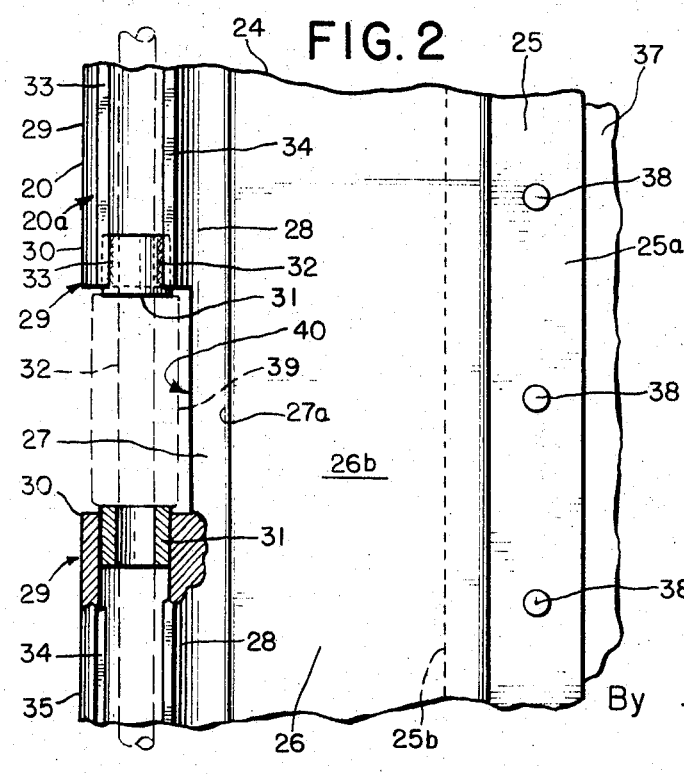
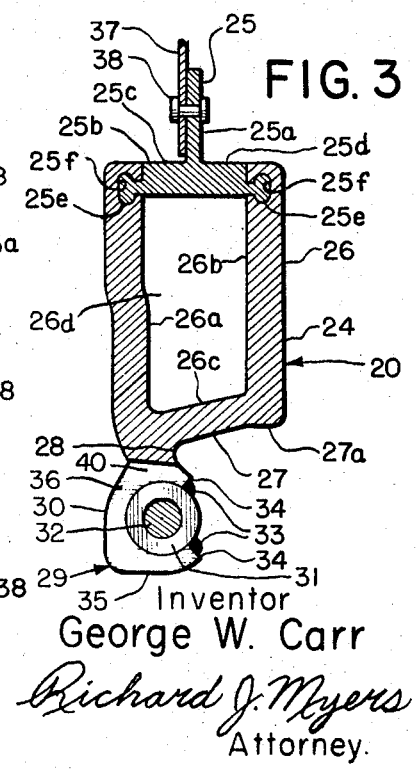
Inventor
George W. Carr
By *Richard J. Myers*
Attorney.

United States Patent Office 3,453,019
Patented July 1, 1969

3,453,019
TRAILER POST CONSTRUCTION
George W. Carr, Cincinnati, Ohio, assignor to Pullman Incorporated, Chicago, Ill., a corporation of Delaware
Filed July 31, 1967, Ser. No. 657,223
Int. Cl. B62d 25/00, 25/04, 39/00
U.S. Cl. 296—28                                  6 Claims

ABSTRACT OF THE DISCLOSURE

A trailer or container rear post construction comprising an upright two-piece extruded aluminum post arrangement comprising a first unit slidable into a second unit, the first unit extending forwardly and receiving a side sheet of the trailer, the second unit comprising a tubular post portion, the rearward end of which forms the rear post hinge portion having an outer protective jacket, said jacket carrying a hinge pin socket for receiving a hinge pin, said hinge portion being periodically notched to provide open portions for receiving complementary door hinge portions.

BACKGROUND OF THE INVENTION

Field of the invention

This invention relates to a highway trailer vehicle construction or to the construction of trailer bodies therefor such as containers or the like which may be transported from one form of transportation to another, such as air, sea, railroad and over-highway trucking and more in particular relates to the post construction of the trailer body or container, such as the rear post which supports the trailer body or container door and carries the side sheets of the trailer body. The invention herein is concerned with an improvement in the upright rear post construction.

Description of the prior art

Economy and simplicity of fabrication of trailer body post constructions has always been an objective in the trailer industry. Also it is desired to use light-weight but durable construction when manufacturing a trailer body. The rear post further must be of sufficient strength and be adapted to carry in a hinging manner the rear door. The problem of light-weight but high strength rear post construction suitably arranged to receive the rear trailer or container doors is solved by the invention disclosed herein.

SUMMARY

This invention has for its advantage, purpose and objective the presentation of a simply constructed light-weight trailer body or container body post construction which is made out of an extruded metal such as an aluminum extrusion and consists of several upright parts which are assembled together by simply sliding action to form a rigid hollow rear post construction. The rear post construction provides for a door hinge protection section which carries the hinge pin sockets which receive the door hinge pins, the sockets being held in place in the post construction as by welding or the like. The hinge protection portion of the rear post is periodically notched or milled out to provide a space for the complementary intercoupling door hinge construction coupled to the rear post hinge arrangement by the hinge pins inserted into the hinge pin sockets. Thus what is provided for is a unitary two-piece aluminum extrusion to define the strengthening member or rear post which is provided with a protective hinge arrangement for carrying the vehicle container door which is inexpensive and light in weight.

These and other objects will become apparent from reference to the following description, accompanying drawing, and appended claims.

BRIEF DESCRIPTION OF THE DRAWING

FIG. 1 is a rear end view of a trailer body or container illustrating the novel rear post construction;

FIG. 2 is a sectioinal view taken along line 2—2 of FIG. 1; and

FIG. 3 is a sectional view taken along line 3—3 of FIG. 1.

DESCRIPTION OF THE PREFERRED EMBODIMENT

With reference now to the drawing and in particular with reference to FIG. 1 there is shown the rear end portion of a container 10 for use on a highway trailer or the like. The trailer container 10 is provided with a top 11, sides 12 and 13, bottom 14, rear 15 and a rear door 16. The rear door 16 comprises two door sections, one of which is removed, the right door section being provided with a door handle 17. The rear 15 of the trailer container 10 is provided with an upper rear header structure 18 and a lower rear header structure 19 and with rear corner posts 20 and 21. Each rear corner post 20 or 21 is provided with a rear corner post hinge 20a. Each rear header 18 or 19 is provided with a pair of rear corner castings 22, 22. The construction just described is conventional with the exception of the novel rear corner posts 20 and 21 to be hereinafter described in detail.

With reference now to FIGS. 1, 2 and 3, it is seen that the rear corner posts 20 and 21 are identical to each other, so for purposes of description we will describe the rear corner post arrangement 20. This post arrangement 20 is a vertically elongated rigid hollow member 24. The hollow member 24 is composed of a T-shaped member or side sheet attachment plate 25 and a corner post U-shaped member and corner post hinge carrier 26. The T-shaped member or side sheet attachment plate 25 comprises a side sheet attachment web 25a, as seen in FIG. 3, that extends generally the vertical length of the container and is attached to and forms with the connected or integral flange 25b a T-shaped configuration. The connecting flange or wall 25b is provided with end portions 25c and 25d, each having a dovetailing end portion 25e that extends vertically and complementally fits or dovetails within the dovetailing aperture portion 25f formed in wall portion 26a and 26b of the U-shaped corner post member or hinge carrier member 26 which is provided with a third wall 26c which defines an opening or vertical cavity 26d with the wall portions 26a, 26b, 26d and 25b. The wall portion 26c is provided with a flat portion 27a and a sloped portion 27 which is integral with a neck portion 28 that attaches itself to the cut-out hinge pin protector and carrier 29 which is integral with the neck portion 28 to form a series of vertically spaced apart rear corner post hinges 20a, as seen in FIG. 1. The rear corner post hinges 20a have actually been formed by milling out openings or apertures in the vertically extending hinge pin protector and carrier part 29 to form the plurality of vertically aligned and spaced apart hinges 20a. The hinge pin protector and carrier part 29 actually forms a C-shaped protecting collar 30 for the socket 31, as seen in FIG. 3, which carries within it hinge pin socket 31, as seen in FIGS. 2 and 3. The hinge pin sockets 31, 31 are spaced apart from one another and held by the collar part 29 as by weldings 33 and the hinge pin 32 is extended through the bore in the hinge pin socket 31 and adapted for complementary intercoupling with door hinges 39. The hinge pin protector guard portion 29 is provided with a rearwardly facing portion 35, a side portion 36, and end portions 34, 34, the end portions 34, 34 being welded by the welds 33, 33 to the hinge pin sockets 31. The side sheet 37 is held by rivet means 38 to the forwardly projecting arm or flange 25a of the sheet attachment plate 25. The door hinge 39 is provided with a plate portion 39a, as seen in FIG. 1, and a hinge portion 39b and screws 39c to hold the door hinge 39 to the door. As seen in FIG. 2 there is shown a cut-out 40 for the door hinge 39 (shown in dotted line in FIG. 2).

Thus it is seen that there is provided a corner post construction 20 which acts not only as a post for supporting the rear portion of the trailer body or container 10 but also being provided with the post hinge structure 20a for carrying the door sections of the door 16. The C-shaped structure 29 of the hinge 20a provides for protection of the hinge pin socket 31 which receives the hinge pin arrangement 32 so that the hinge pin socket 31 cannot become readily damaged by hitting some object. The post construction 20 comprises the U-shaped part 26 and the T-shaped part 25 which may be assembled with respect to one another by sliding one part 25 into the other part 26 vertically through connecting of the dovetailing parts 25e and 25f thereof to form a hollow tubular or post structure 20 having a forwardly extending side sheet attaching flange and a rearwardly extending hinge means for carrying a door pivotally thereon.

It will be appreciated that such terms as "forward" and "rearward" are for purposes of description but not limitation in the scope of the appended claims.

The foregoing description and drawings merely explain and illustrate the invention and the invention is not limited thereto, as those skilled in the art who have the disclosure before them will be able to make modifications and variations therein without departing from the scope of the invention.

What is claimed is:

1. A corner post construction for a container or the like, comprising:
    an inner side sheet attaching part having a wall section,
    a one-piece end corner post part having wall portions slidably mating with said wall section to form an annular tube to define therewith a tubular post construction,
    said end part having a vertically extending integral hinge portion,
    said hinge portion being provided with a plurality of vertically apertured door hinge receiving sections and a plurality of complementary vertically separated post hinge sections,
    each post hinge section being defined by a socket protective collar-like portion and hinge pin receiving socket means being disposed within protective collar-like portion, said socket means being provided with aperture means adapted to receive a hinge pin for connection to the door of the container.

2. The invention according to claim 1, and each of said parts being of extruded aluminum.

3. The invention according to claim 1, and each part being provided with dovetailing means for complementary dovetailing of one with the other.

4. The invention according to claim 1, and said protective collar-like portion being generally C-shaped and partially surrounding said socket means and being fixed thereto.

5. A corner post construction for a container or the like, comprising:
    an inner side sheet attaching part,
    an end corner post part having portions connecting with said inner part to define therewith a tubular post construction,
    said end part having a vertically extending hinge portion,
    said hinge portion being provided with a plurality of vertically apertured door hinge receiving sections and a plurality of complementary vertically separated post hinge sections,
    each post hinge section being defined by a socket protective collar-like portion and hinge pin receiving socket means being disposed within protective collar-like portion,
    said inner part being generally T-shaped and said end part being generally U-shaped and slidably fitted in the cross portion of the T-shaped part to define said tubular post construction.

6. A two-piece member rear post construction for the side sheeting of a trailer and for a hinged trailer door, comprising:
    an inwardly extending sheet attaching member having a wall section and an end door hinge member having a wall portion slidably fitted in and matingly connected with the wall section of the inner member to form therewith the tube of a tubular rear post construction, and
    said door hinge member comprising a generally integral C-shaped hinge pin socket protector,
    a hinge pin socket disposed therein and having a hinge pin receiving aperture,
    said socket being fixedly attached within said socket protector.

References Cited
UNITED STATES PATENTS

| 2,776,736 | 1/1957 | Aaron | 52—730 |
| 2,793,068 | 5/1957 | Tenenbaum. | |
| 3,164,228 | 1/1965 | Segre | 49—397 |

LEO FRIAGLIA, *Primary Examiner.*

JOHN A. PEKAR, *Assistant Examiner.*

U.S. Cl. X.R.

16—128; 49—397